United States Patent [19]

Benazzi et al.

[11] Patent Number: 5,961,816
[45] Date of Patent: Oct. 5, 1999

[54] CATALYST COMPRISING A TRIOCTAHEDRAL 2:1 PHYLLOSILICATE PREPARED IN A FLUORIDE MEDIUM AND A PROCESS FOR THE HYDROCONVERSION OF PETROLEUM FEEDS

[75] Inventors: Eric Benazzi, Montesson; Samuel Mignard, Chatou, both of France

[73] Assignee: Institut Francais du Petrole, France

[21] Appl. No.: 08/813,587

[22] Filed: Mar. 7, 1997

[30] Foreign Application Priority Data

Mar. 8, 1996 [FR] France .................................. 96 02910

[51] Int. Cl.⁶ ............................ C10G 47/18; B01J 21/16
[52] U.S. Cl. ................................... 208/111.3; 208/111.35; 208/110; 502/60; 502/63; 502/64; 502/68; 502/80; 502/84
[58] Field of Search ................................ 502/60, 63, 64, 502/68, 80, 84; 208/111.3, 111.35, 110

[56] References Cited

U.S. PATENT DOCUMENTS

| | | | |
|---|---|---|---|
| 3,664,972 | 5/1972 | Jaffe | 502/84 |
| 3,966,642 | 6/1976 | Black et al. | 502/74 |
| 4,766,099 | 8/1988 | Dufresne et al. | 502/72 |
| 5,023,221 | 6/1991 | Occelli | 502/66 |
| 5,089,458 | 2/1992 | Breukelaar et al. | 502/63 |
| 5,248,644 | 9/1993 | Johnson et al. | 502/84 |
| 5,414,185 | 5/1995 | Salem et al. | 585/721 |

FOREIGN PATENT DOCUMENTS

| | | |
|---|---|---|
| 0 219 174 | 4/1987 | European Pat. Off. . |
| 0 503 995 | 9/1992 | European Pat. Off. . |
| 0 692 367 | 1/1996 | European Pat. Off. . |
| 2 682 371 | 4/1993 | France . |
| 2 720 387 | 12/1995 | France . |

OTHER PUBLICATIONS

Database WPI, Section Ch, Week 9207, Derwent Publications Ltd., London, GB. 92–053997 Jan. 1992.

*Primary Examiner*—Thomas Dunn
*Attorney, Agent, or Firm*—Millen, White, Zelano & Branigan, P.C.

[57] ABSTRACT

A catalyst comprising at least one catalytic element, and a support comprising 20–99% by weight of at least one matrix, 1–80% by weight of at least one 2:1 trioctahedral phyllosilicate containing fluorine and 0–30% by weight of at least one Y zeolite, in which the catalytic element is from groups VI and/or VIII, and phosphorous can be present, as well as a process for the hydroconversion of petroleum with said catalyst.

32 Claims, No Drawings

CATALYST COMPRISING A TRIOCTAHEDRAL 2:1 PHYLLOSILICATE PREPARED IN A FLUORIDE MEDIUM AND A PROCESS FOR THE HYDROCONVERSION OF PETROLEUM FEEDS

BACKGROUND OF THE INVENTION

The present invention concerns a catalyst comprising at least one catalytic element and a support comprising at least one 2:1 trioctahedral phyllosilicate containing fluorine, optionally and preferably bridged, at least one matrix and optionally, at least one Y zeolite with a faujasite structure. The invention also concerns a process for the hydroconversion of heavy petroleum feeds using this catalyst.

Hydrocracking of heavy petroleum feeds is a very important refining process which can produce lighter fractions such as gasolines, jet fuels and light gas oils from surplus heavy feeds which are not very valuable, which fractions the refiner needs in order to adapt production to market demands. In comparison with catalytic cracking, catalytic hydrocracking is intended to provide very high quality middle distillates, jet fuels and gas oils. In contrast, the gasoline produced has a much lower octane number than that from catalytic cracking.

Catalysts used for hydrocracking are all bifunctional, combining an acid function with a hydrogenating function. The acid function is provided by supports with large surface areas (150 to 800 $m^2.g^{-1}$ in general) with superficial acidity, such as halogenated aluminas (in particular chlorinated or fluorinated), combinations of boron oxide and aluminium, amorphous silica-aluminas and zeolites. The hydrogenating function is provided either by one or a plurality of metals from group VIII of the periodic classification of the elements such as iron, cobalt, nickel, ruthenium, rhodium, palladium, osmium, iridium and platinum, or by a combination of at least one metal from group VI of the periodic classification of the elements such as chromium, molybdenum and tungsten and at least one group VIII metal.

The balance between the two functions, acid and hydrogenating, is a fundamental parameter which governs the activity and selectivity of the catalyst. A weak acid function and a strong hydrogenating function result in catalysts which are of low activity, which operate generally at high temperatures (greater than or equal to 390° C.) and at low space velocities (HSV expressed as the volume of feed to be treated per unit volume of catalyst per hour generally less than or equal to 2) but have very high selectivity towards middle distillates. In contrast, a strong acid function and a weak hydrogenating function produces very active catalysts but with poor selectivity towards middle distillates. The correct choice of each of these functions is the problem which must be solved in order to adjust the activity/selectivity couple of the catalyst.

It is thus of major interest in hydrocracking to have wide flexibility available on a number of levels: flexibility as regards the catalysts used, which results in flexibility in the feeds to be treated and in the products obtained.

The great majority of conventional hydrocracking catalysts are constituted by supports which are weakly acidic, such as amorphous silica-aluminas. Such systems are used to produce very high quality middle distillates and, when the acidity is very low, oil stock.

Amorphous silica-aluminas are weak acid supports. Many of the hydrocracking catalysts on the market are constituted by silica-alumina associated with either a group VIII metal or, as is preferable when the amount of heteroatomic poisons in the feed exceeds 0.5% by weight, an association of sulphides of metals from groups VIB and VIII. Such systems have very good selectivity towards middle distillates and high quality products are formed. For the most weakly acidic among them, such catalysts can also produce lubricant stock. As already stated, the disadvantage of all of such catalytic systems based on an amorphous support is their low activity.

SUMMARY OF THE INVENTION

Our research on a large number of zeolites and crystalline microporous solids has led to the surprising discovery that a catalyst containing at least one trioctahedral 2:1 phyllosilicate containing fluorine, preferably synthesized in a fluoride medium and preferably bridged, optionally and advantageously combined with a Y zeolite with a faujasite structure, can result in substantially improved selectivity towards middle distillates compared with known prior art catalysts.

Trioctahedral 2:1 phyllosilicates are minerals which are formed by layering elemental sheets. Each sheet comprises two tetrahedral layers located one on each side of an octahedral layer. The tetrahedral layer is based on $\Delta O_4$ tetrahedra, 3 out of 4 vertices being common to 2 tetrahedra and one vertex being free, giving the formula $\Delta O_{(3/2+1)}$, $\Delta$ representing a tetrahedral cavity and O representing an oxygen atom. The octahedral layer is constituted by $\square O_6$ octahedra, the 6 vertices being common to 3 tetrahedra, giving the formula $\square O_{6/3}$. $\square$ represents an octahedral cavity. By limiting the content of a sheet to a half unit cell, $4\Delta_4 O_{(6+4)}$ tetrahedra are located two by two on each side of $3\square_3 O_6$ octahedra and have 4 vertices in common: $\Delta_4 \square_3 O_{(12)}$. Two O atoms in the octahedral layer do not participate in this sharing and are saturated with H atoms: $\Delta_4 \square_3 O_{10}(OH)_2$. The tetrahedral cavities $\Delta$ are usually occupied by silicon atoms and the three octahedral cavities $\square$ are occupied by magnesium atoms: $Si_4 Mg_3 \square O_{10}(OH)_2$. This structure is electrically neutral.

The tetrahedral element silicon can be completely or partially substituted by trivalent elements such as aluminium or gallium. Similarly, the octahedral element magnesium can be substituted by trivalent elements (for example Al or Fe), and/or divalent elements (for example Co) and/or monovalent elements (for example Li). These substitutions confer negative charges on the structure. This necessitates the existence of exchangeable compensating cations located in the space between the sheets. The thickness of the space between the sheets depends on the nature of the compensating cations and their hydration. This space is also capable of accepting other chemical species such as water, amines, salts, alcohols, bases etc. . .

The existence of —OH groups causes thermal instability due to a dehydroxylation reaction with equation: 2—OH→—O—+$H_2O$. In this respect, the introduction of the element fluorine during synthesis into the structure in place of the O—H groups produces phyllosilicates with greatly improved thermal stability.

The general chemical formula (for a half-cell) of trioctahedral 2:1 phyllosilicates synthesised in a fluorine medium before bridging is as follows:

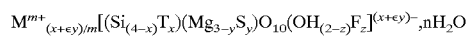

where

S is at least one element selected from the group formed by the monovalent element Li, divalent elements Zn, Ni, Co, Mn, Fe and Cu, and trivalent elements Al and Ga;

T represents an element selected from group IIIA and iron;

M is at least one compensating cation from the reaction medium or introduced by at least one ion exchange process, selected from the group formed by cations of elements from groups IA, IIA and VIII of the periodic classification of the elements, rare earth cations (cations of elements with atomic number 57 to 71 inclusive), organic cations containing nitrogen (including alkylammonium and arylammonium cations and the ammonium cation), and a proton;

m is the valence of cation M;

x is a number which is in the range 0 to 2;

y is a number which is between 0 and 1;

z is a number which is greater than 0 and less than or equal to 2;

n is a positive number or zero; and where $\epsilon$:

equals 1 when S is a monovalent element;

equals 0 when S is a divalent element;

equals −1 when S is a trivalent element.

The X ray diffraction diagram is characterized by the presence of the following lines:

a line corresponding to a $d_{hkl}$ of $1.52\pm0.01\times10^{-10}$ m;

two furtherlines at $d_{hkl}$ values of $4.53\pm0.02\times10^{-1}$ m and $2.56\pm0.045\times10^{-10}$ m;

at least one 001 reflection such that $d_{001}$ is 10.5 and $19.5\times10^{-10}$ m depending on the chemical formula of said phyllosilicate.

Preferably, the fluorine content is such that the F/Si molar ratio is in the range 0.1 to 4.

The phyllosilicates are synthesised in a fluorinated medium in the presence of HF acid and at a pH of less than 7.

The preparation of these types of solids in a fluoride medium and their characterization are described in French patent FR-A-2,682,371, the teaching of which is hereby incorporated by reference in the present description.

The scope of the invention also includes any type of trioctahedral 2:1 phyllosilicate containing fluorine. This fluorine can be added on synthesis or after synthesis. Any preparation method is suitable, and that described above is highly advantageous.

The trioctahedral 2:1 phyllosilicates can be bridged using any technique which is known to the skilled person, in particular the bridging process developed by us and described in patents FR-A-2,720,386 and FR-A-2,720-387, the teachings of which are hereby incorporated by reference. This process comprises at least one treatment comprising a first step in which a solution of polycations is brought into contact with the phyllosilicate to be bridged comprising exchangeable cations, to form the reaction mixture; then in a second step, exchange is carried out between the polycations and the exchangeable cations of the phyllosilicate: and finally, in a third step the product obtained is separated by filtering and washing; the treatment is characterized in that:

the mass of the clay to be bridged per total solution volume is in the range 1 to 200 g/l;

the second, exchange, step is carried out at a temperature which is in the range 15° C. to 100° C.; said second step has a duration which is in the range 1 minute to 3 hours;

the separation time in the third step is in the range 20 seconds to 60 minutes per litre of solution containing the product to be separated in suspension.

This bridging process can simply and rapidly introduce, for example, $[Al_{13}O_4(OH)_{24}(H_2O)_{12}]^{7+}$ polycations, also known as Keggin ions, or polycations containing at least one element selected from the group formed by zirconium, titanium, molybdenum and vanadium, non limiting examples of which are: $[Zr_4(OH)_8(H_2O)_{16}]^{8+}$, or $[ZrOCl_2Al_8(OH)_{20}]^{4+}$.

The catalyst of the present invention can also contain a Y zeolite with a faujasite structure (Zeolite Molecular Sieves: Structure, Chemistry and Uses, D. W. Breck, J Wiley & Sons, 1973). Of the Y zeolites which can be used, a stabilised Y zeolite is preferably used, which is known as ultrastable zeolite or USY, either in a form which is at least partially exchanged with metal cations, for example cations of alkaline-earth and/or rare earth metals with atomic number 57 to 71 inclusive, or in the hydrogen form.

An acidic zeolite HY is particularly advantageous and is characterized by different specifications: a $SiO_2/Al_2O_3$ molar ratio which is in the range about 8 to 70, preferably in the range 12 to 40; a sodium content of less than 0.15% by weight, determined using zeolite calcined at 1100° C.; a crystal parameter in the unit cell which is in the range $24.55\times10^{-10}$ m and $24.24\times10^{-10}$ m, preferably in the range $24.38\times10^{-10}$ m to $24.26\times10^{-10}$ m; a sodium take-up capacity CNa, expressed as the number of grams of Na per 100 grams of modified zeolite, neutralized then calcined, of more than about 0.85; a specific surface area (determined using the B.E.T method) of about 400 $m^2/g$, preferably more than 550 $m^2/g$, a water vapor adsorption capacity of more than about 6% at 25° C. at a partial pressure of 2.6 torrs (i.e., 34.6 MPa), a pore distribution in the range 1% to 20%, preferably in the range 3% to 15%, of the pore volume contained in pores of diameters between $20\times10^{-10}$ m and $80\times10^{-10}$ m, the remainder of the pore volume being contained in pores with a diameter of less than $20\times10^{-10}$ m.

The catalyst of the present invention also contains at least one matrix which is normally amorphous or only slightly crystalline selected, for example, from the group formed by alumina, silica, magnesia, titanium oxide, zirconia, aluminium, titanium or zirconium phosphates, combinations of two or more of these compounds, and alumina-boron oxide combinations.

The matrix is preferably selected from the group formed by silica, alumina, magnesia, silica-alumina combinations, and silica-magnesia combinations.

The catalyst support of the present invention thus comprises:

a) 20% to 99%, or 30% to 96%, preferably 40% to 90%, more preferably 50% to 85% by weight, of matrix (matrices);

b) 1% to 80%, or 4% to 70%, preferably 10% to 60%, more preferably 15% to 50% by weight, of trioctahedral 2:1 phyllosilicate(s) synthesised in a fluoride medium and optionally bridged;

c) 0 to at most 30%, or 0. 1% to 30%, preferably 0 to at most 0% or 0. 1% to 20%, more preferably 0 to at most 30% or 0.1% to 10% of Y zeolite(s) with a faujasite structure, in the hydrogen form, preferably with the characteristics given above.

The catalyst of the present invention can be prepared by any of the methods known to the skilled person. A preferred method for use in the present invention consists of grinding a trioctahedral 2:1 phyllosilicate, synthesized in a fluoride medium and optionally bridged, and optionally a Y zeolite, in a wet alumina gel for several tens of minutes, then passing the paste obtained through a die to form extrudates with a diameter which is in the range 0.4 to 4 mm.

The catalyst also contains at least one catalytic element, for example a metal with a hydro-dehydrogenating function.

The hydro-dehydrogenating function is provided by at least one metal or compound of a metal from group VIII such as nickel or cobalt. A combination of at least one metal or compound of a metal from group VI (in particular molybdenum or tungsten) and at least one metal or compound of a metal from group VIII (in particular cobalt or nickel) of the periodic classification of the elements can be used. The total concentration of oxides of metals from groups VI and/or VIII is in the range 1% to 40% by weight of the catalyst, preferably in the range 3% to 30%, advantageously in the range 8% to 40%, more preferably 10% to 40% and most preferably 10% to 30%, and the ratio of the metal(s) from group VI to the metal(s) from group VIII is in the range 1.25 to 20, preferably in the range 2 to 10, expressed as the weight of metal oxide. Further, the catalyst can contain phosphorous. The phosphorous content, expressed as the concentration of phosphorous oxide $P_2O_5$, is advantageously less than 15% by weight, preferably less than 10% by weight.

The hydrogenating function in itself, which has been described above (elements from group VIII or a combination of elements from groups VI and VIII), can be introduced into the catalyst at different stages of the preparation and in different manners.

It can be introduced in part only (for example with combinations of groups VI and VIII) or completely when grinding the trioctahedral 2:1 phyllosilicate synthesised in a fluoride medium and optionally bridged, with a gel of the oxide selected as the matrix. It can be introduced by one of more ion exchange operations carried out on the calcined trioctahedral 2:1 phyllosilicate based support which has been synthesized in a fluoride medium and optionally dispersed in the selected matrix, using solutions containing precursor salts of the selected metals, in particular salts of elements from group VIII. It can be introduced by one or more steps for impregnating the formed and calcined support using a solution of precursors of oxides of metals from group VIII (in particular cobalt and nickel) when the precursors of oxides of metals from group VI (in particular molybdenum or tungsten) have already been introduced when grinding the support. Finally, it can be introduced by one or more impregnation operations for a support based on a trioctahedral 2:1 phyllosilicate, synthesised in a fluoride medium and optionally bridged, and a matrix, advantageously already formed and calcined, using one or more solutions containing precursors of oxides of metals of groups VI and/or VIII, precursors of oxides of group VIII metals preferably being introduced after those of group VI or optionally at the same time as the latter.

When the metal oxides are introduced in several steps for impregnating the corresponding precursor salts, an intermediate calcining step is preferably carried out on the catalyst at a temperature which is in the range 250° C. to 600° C.

Molybdenum impregnation can be facilitated by addition of phosphoric acid to solutions of ammonium paramolybdate.

The catalysts obtained are used to hydrocrack heavy cuts, and exhibit improved activity over the prior art. In addition, they have improved selectivity towards the production of very high quality middle distillates.

The feeds used in the process are, for example, gas oils, vacuum distillates, vacuum gas oils, or deasphalted residues or their equivalent. Feeds containing high concentrations of N and S preferably have already been hydrotreated. Preferably, at least 80% of their volume is constituted by compounds with boiling points which are at least 350° C., preferably 350° C. to 580° C. (i.e., corresponding to compounds containing at least 15 to 20 carbon atoms). They generally contain heteroatoms such as sulphur and nitrogen. The nitrogen content is usually in the range 1 to 5000 ppm by weight and the sulphur content is in the range 0.01% to 5% by weight. The hydrocracking conditions, such as temperature, pressure, hydrogen recycle ratio, hourly space velocity, can vary widely depending on the nature of the feed, the quality of the desired products, and the installations available to the refiner.

The temperature is generally more than 230° C., usually in the range 300° C. to 480° C., and preferably less than 450° C. The pressure is greater than or equal to 2 MPa, generally more than 3 MPa, up to 10 MPa, and less than 30 MPa. The quantity of hydrogen is generally a minimum of 100 l/l of feed, usually in the range 260 to 3000 liter of hydrogen per liter of feed. The hourly space velocity is generally between 0.2 and 10 $h^{-1}$.

The factors which are important to the refiner are the activity and selectivity towards middle distillates. Fixed targets must be achieved under conditions which are compatible with economic reality. The refiner thus seeks to reduce the temperature, pressure, and quantity of hydrogen and to maximise the hourly space velocity. Conversion is also known to be increased by raising the temperature, but it is often to the detriment of selectivity. Selectivity towards middle distillates improves with an increase in the pressure or the quantity of hydrogen, but this is to the detriment of the economy of the process. This type of catalyst can, under conventional operating conditions, produce selectivities towards middle distillates with boiling points in the range 150° C. to 380° C. of more than 65%, for levels of conversion to products with boiling points of less than 380° C. of more than 55% by volume. Under less severe mild hydrocracking conditions, the selectivities towards middle distillates are over 65% (and generally more than 75%) for levels of conversion of more than 30%, generally around 40–50%, and usually less than 55%. Further, under these conditions, the catalyst has remarkable stability. Finally, because of the composition of the catalyst, it can readily be regenerated.

The following examples illustrate the present invention without in any way limiting its scope.

EXAMPLES

Example 1

Preparation of Bridged Trioctahedral 2:1 Phyllosilicate PP1 for Composition C1, in Accordance with the Invention The following were added to 36 g of distilled water, successively and as indicated:

0.94 g of HF acid, 40% (Fluka);

7.20 g of the salt $(CH_3CO_2)_2Mg,4H_2O$ (Prolablo, with vigorous stirring;

0.093 g of the salt NaF (Prolabo)

0.16g of the oxide ALOOH (Catapal B Vista);

2.50 g of powdered $SiO_2$ oxide (Aerosil 130 from Degussa), with moderate stirring.

The composition of the hydrogel thus prepared, with respect to one mole of oxide $SiO_2$, was:

$1.0SiO_2$; $0.026Al_2O_3$; $0.053$ NaF; $0.79$ MgO; $0.45$ HF; $48$ $H_2O$ giving, in molar terms:
Mg/Si=0.79
Al/Si=0.052
Na/Si=0.053

F/Si=0.503
acid/Si=0.45
H$_2$O/Si=48

This composition did not take into account the water provided by the magnesium source, the aluminium source and the HF acid.

The hydrogel obtained was aged for 4 hours at ambient temperature (20° C.) with moderate stirring. The pH was close to 4.5.

Crystallization was then carried out at 220° C. in a 120 ml steel autoclave, lined with a teflon coating, under autogenous pressure for 260 hours, without stirring. The autoclave was then cooled in air.

The product was recovered, filtered and washed with copious quantities of distilled water. It was then dried at 40–50° C. for 24 hours.

After 24 hours, the product obtained was characterized by its X ray diffraction spectrum, as shown below, recorded at ambient temperature and humidity:

| d$_{hkl}$ (Å) | I/I$_0$ |
|---|---|
| 14.1 | 100 b |
| 4.53 | 31 b |
| 2.579 | 15 b |
| 2.275 | 1 |
| 1.710 | 5 |
| 1.518 | 12 | b: broad band (the d$_{hkl}$ shown is that of the maximum band intensity).

This diffraction spectrum was characteristic of that of the trioctahedral 2:1 phyllosilicates of the invention.

The fluorine content of the phyllosilicate obtained was 5%.

The trioctahedral 2:1 phyllosilicate prepared was designated P1. This latter then underwent a bridging step using the operating procedure described below.

8 g of the prepared trioctahedral 2:1 phyllosilicate designated P1 was directly dissolved in 160 ml of a solution of Keggin ions $[Al_{13}O_4(OH)_{24}(H_2O)_{12}]^{7+}$ which were in a concentration of the order of $9 \times 10^{-3}$ mol/l, with a pH of 4. As an example, this solution was prepared using the operating procedure published by K Urabe et al., "Advanced Materials 3", no. 11 (1991).

The mass of clay to be bridged per total solution volume was thus 50 g/l.

After an exchange period of 10 minutes, with stirring, at ambient temperature, and a filtration step of 2 minutes, the product was washed with distilled water for 2 minutes, then dried overnight at 90° C. (about 15 hours). The mass of the bridged phyllosilicate after ion exchange and drying at 60° C. was 8.5 g. The reticular spacing dool was of the order of 1.79 nm and the specific surface area measured using the BET method was of the order of 194 m$^2$/g. After 5 hours calcining at 550° C. in air, the bridged clay had a reticular spacing d$_{001}$ of the order of 1.83 nm and a BET specific surface area of 182 m$^2$/g.

The trioctahedral 2:1 phyllosilicate thus prepared was designated PP1.

Example 2

Preparation of Catalyst C1 (in accordance with the invention)

Trioctahedral 2:1 phyllosilicate PP1 described in Example 1 was ground with SB3 type alumina provided by Condéa. The ground paste was extruded through a 1.4 mm diameter die. The extrudates were dry impregnated with a solution of a mixture of ammonium heptamolybdate, nickel nitrate and orthophosphoric acid, and finally calcined in air at 550° C. in-situ in the reactor in which they were in the form of a fixed bed. The active oxide contents were as follows (by weight with respect to catalyst):

2.5% by weight of phosphorous oxide P$_2$O$_5$
15% by weight of molybdenum oxide MoO$_3$
5% by weight of nickel oxide NiO The bridged clay content in the catalyst ensemble was 40% by weight.

Example 3

Preparation of Catalyst C2 (in accordance with the invention)

Trioctahedral 2:1 phyllosilicate PP1 described in Example 1 and an HY zeolite with a lattice parameter of $24.33 \times 10^{-10}$ m were ground with SB3 type alumina provided by Condéa.

The ground paste was extruded through a 1.4 mm diameter die. The extrudates were dry impregnated with a solution of a mixture of ammonium heptamolybdate, nickel nitrate and orthophosphoric acid, and finally calcined in air at 550° C. in-situ in the reactor in which they were in the form of a fixed bed. The active oxide contents were as follows (by weight with respect to catalyst):

2.5% by weight of phosphorous oxide P$_2$O$_5$
15% by weight of molybdenum oxide MoO$_3$
5% by weight of nickel oxide NiO The bridged clay content in the catalyst ensemble was 35% by weight, and the HY zeolite content was 5% by weight.

Example 4

Preparation of Catalyst C3 (not in accordance with the invention)

A laboratory prepared silica-alumina containing 25% by weight of SiO$_2$ and 75% by weight of Al$_2$O$_3$ was used. 3% by weight of pure nitric acid was added to 67% with respect to the dry weight of the silica-alumina powder to peptise the powder. After grinding, the paste obtained was extruded through a 1.4 mm diameter die. The extrudates were calcined then dry impregnated with a solution of a platinum tetramine chloride salt Pt(NH$_3$)$_4$Cl$_2$ and finally calcined in air at 550° C. The platinum content in the final catalyst was 0.6% by weight.

Example 5

Evaluation of Catalysts C1, C2 and C3 in a Hydrocracking Test

Catalysts C1 and C2 prepared as above were used under hydrocracking conditions with a petroleum cut with the following principal characteristics:

| | |
|---|---|
| initial boiling point | 277° C. |
| 10% point | 381° C. |
| 50% point | 482° C. |
| 90% point | 531° C. |
| end boiling point | 545° C. |
| pour point | +39° C. |
| density (20/4) | 0.919 |
| sulphur(weight %) | 2.46 |
| nitrogen (ppm by weight) | 930 |

The catalytic test unit comprised a fixed bed reactor, in up-flow mode, into which 80 ml of catalyst was introduced. Each catalyst was sulphurized with a n-hexane/DMDS+ aniline mixture up to 320° C. The total pressure was 9 MPa, the hydrogen flow rate was 1000 litres of hydrogen gas per litre of injected feed, and the hourly space velocity was 1.0 h$^{-1}$.

Catalytic performance was expressed as the temperature for 70% gross conversion and by the gross selectivity. These catalytic performances were measured for the catalyst after a stabilization period which was generally at least 48 hours.

The gross conversion GC was taken as:

$$GC = \frac{\% \text{ by weight } 380^- \text{ effluents}}{100}$$

The gross selectivity GS was taken as:

$$GS = \frac{(\text{weight of } 150/380^-_{\text{effluents}})}{\text{weight of } 380^-_{\text{effluents}}} \times 100$$

| Example no | T (° C.) (70% GC) | GS (70% GS) |
|---|---|---|
| Catalyst C1 invention | 415 | 72.9 |
| Catalyst C2 invention | 408 | 72.3 |
| Catalyst C3 not invention | 438 | 73.8 |

The use of a trioctahedral 2:1 phyllosilicate bridged with $[Al_{13}O_4(OH)_{24}(H_2O)_{12}]^{7+}$ polycations can substantially reduce the gross conversion GC temperature since a gain of about 23° C. is observed between the catalyst containing a trioctahedral 2:1 phyllosilicate bridged by $[Al_{13}O_4(OH)_{24}(H_2O)_{12}]^{7+}$ polycations (catalyst C1) and the catalyst not containing it (catalyst C3).

In general, selectivity varies greatly with conversion. Selectivity increases as conversion decreases. The use of such a bridged trioctahedral 2:1 phyllosilicate thus produces a substantial gain in the iso-conversion temperature without detriment to the selectivity towards middle distillates.

The use of a bridged trioctahedral 2:1 phyllosilicate jointly with an HY zeolite (catalyst C2) can also result in a reduction in the gross conversion GC temperature (gain of 30° C.) with respect to catalyst C3 which is not in accordance with the invention, without detriment to the selectivity towards middle distillates.

Example 6

Evaluation of Catalysts C1 and C3 in a Low Pressure Hydrocracking Test

Catalysts C1 and C3 were compared in a low pressure hydrocracking test, also known as mild hydrocracking. The feed used during the catalytic test was the same as that used in Example 5.

The catalytic test unit comprised a fixed bed reactor, in up-flow mode, into which 80 ml of catalyst was introduced. Each catalyst was sulphurized with a n-hexane/DMDS+ aniline mixture up to 320° C. The total pressure was 5 MPa, the hydrogen flow rate was 500 liter of hydrogen gas per liter of injected feed, and the hourly space velocity was 0.5 h$^{-1}$.

Catalytic performances were expressed as the gross conversion obtained at a given temperature (in this case, 400° C.) and by the gross selectivity for a gross conversion of 50%. These catalytic performances were measured for the catalyst after a stabilisation period which was generally at least 48 hours.

The gross conversion GC was taken to be:

$$GC = \frac{\% \text{ by weight } 380^- \text{ effluents}}{100}$$

The gross selectivity GC was taken to be:

$$GS = \frac{(\text{weight of } 150/380^-_{\text{effluents}})}{\text{weight of } 380^-_{\text{effluents}}} \times 100$$

| Example no | GC at 400° C. | GS (50% GC) |
|---|---|---|
| Catalyst C1 invention | 41.8 | 81.6 |
| Catalyst C3 not invention | 38.3 | 81.0 |

The use of a bridged trioctahedral 2:1 phyllosilicate bridged with $[Al_{13}O_4(OH)_{24}(H_2O)_{12}]^{7+}$ polycations (catalyst C1 from Example 2) produced about a 3.5% gain in conversion at 400° C. with respect to the catalyst which did not contain it (catalyst C3 of Example 4). The selectivity obtained for 50% gross 20 conversion was slightly greater in the case of catalyst C1 of Example 2, comprising a trioctahedral 2:1 phyllosilicate bridged by $[Al_{13}O_4(OH)_{24}(H_2O)_{12}]^{7+}$ polycations, than the selectivity recorded for a silica-alumina based catalyst (catalyst C3 from Example 4). These results show that the catalyst containing trioctahedral 2:1 phyllosilicate bridged with $[Al_{13}O_4(OH)_{24}(H_2O)_{12}]^{7+}$ cations has a selectivity which is slightly greater than that of a silica-alumina and, in particular, has a higher activity.

We claim:

1. A catalyst comprising
   a support comprising 20–99% by weight of at least one matrix, 1–80% by weight of at least one trioctahedral 2:1 phyllosilicate containing fluorine, and 0.1–30% by weight of at least one Y zeolite;
   and at least one catalytic element.

2. A catalyst according to claim 1, in which the catalytic element is at least one material from groups VI and/or VIII of the periodic table, and the catalyst contains 1–40% by weight of said element.

3. A catalyst according to claim 1, also containing phosphorous.

4. A catalyst according to claim 3, containing less than 15% of phosphorous.

5. A catalyst according to claim 1, in which the trioctahedral 2:1 phyllosilicate is synthesized in a fluoride medium.

6. A catalyst according to claim 1, in which the trioctahedral 2:1 phyllosilicate has:

a) the following general chemical formula for a half-cell:

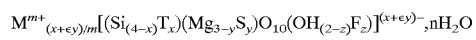

$$M^{m+}{}_{(x+\epsilon y)/m}[(Si_{(4-x)}T_x)(Mg_{3-y}S_y)O_{10}(OH_{(2-z)}F_z)]^{(x+\epsilon y)-}, nH_2O$$

where
   S is at least one of Li, Zn, Ni, Co, Mn, Fe, Cu, Al or Ga;
   T represents an element of group IIIA of the periodic classification of the elements or iron;
   M is at least one compensating cation from the reaction medium or introduced by at least one ion exchange process, from groups IA, IIA or VIII of the periodic table, a proton, an organic cation containing nitrogen, an ammonium cation or a rare earth cation;
   m is the valence of cation M;
   x is 0 to 2;
   y is between 0 and 1;
   z is greater than 0 and less than or equal to 2;

n is a positive real number or zero;

ε equals 2 when S is monovalent element;

ε equals 0 when S is divalent element;

ε equals −1 when S is trivalent element;

b) an X-ray diffraction diagram having the following lines:

a line corresponding to a $d_{hkl}$ of $1.52 \pm 0.01 \times 10^{-10}$ m;

two further lines at $d_{hkl}$ values of: $4.53 \pm 0.02 \times 10^{-10}$ m and $2.56 \pm 0.045 \times 10^{-10}$ m;

at least one 001 reflection such that $d_{001}$ is: $10.5 \times 10^{-10}$ m or $19.5 \times 10^{-10}$ m;

c) a fluorine content producing a F/Si molar ratio of 0.1 to 4.

7. A catalyst according to claim 6, in which the phyllosilicate is synthesized in a medium with a pH of less than 7.

8. A catalyst according to claim 1, in which the trioctahedral 2:1 phyllosilicate is bridged.

9. A catalyst according to claim 8, in which the trioctahedral 2:1 phyllosilicate is bridged using a process comprising at least one treatment in which a solution of polycations is brought into contact with the phyllosilicate to be bridged comprising exchangeable cations, to form a reaction mixture; then exchange is carried out between the polycations and the exchangeable cations of the phyllosilicate; and the product obtained is separated by filtering and washing; wherein the mass of the phyllosilicate to be bridged per total solution volume is 1 to 200 g/l;

the exchange is carried out at a temperature of 15° C. to 100° C.; for 1 minute to 3 hours; and separation is for 20 seconds to 60 minutes per liter of solution containing product to be separated in suspension.

10. A catalyst according to claim 9, in which the polycations used are $[Al_{13}O_4(OH)_{24}(H_2O)_{12}]^{7+}$, polycations containing at least one of zirconium, titanium, molybdenum or vanadium, $[Zr_4(OH)_8(H_2O)_{16}]^{8+}$, or $[ZrOCl_2Al_8(OH)_{20}]^{4+}$.

11. A catalyst according to claim 1, in which the catalyst support comprises 20% to 99% by weight of matrix, 1% to 80% by weight of trioctahedral 2:1 phyllosilicate, and 0.1 to 30% by weight of Y zeolite.

12. A catalyst according to claim 1, in which the catalyst support comprises 30% to 96% by weight of matrix, 4% to 70% by weight of trioctahedral 2:1 phyllosilicate, and 0.1 to 20% by weight of Y zeolite.

13. A catalyst according to claim 1, in which the catalyst support comprises 50% to 85% by weight of matrix, 15% to 50% by weight of trioctahedral 2:1 phyllosilicate, and 0.1 to 10% by weight of Y zeolite.

14. A catalyst according to claim 1, in which the support contains 10% to 30% of at least one Y zeolite.

15. A catalyst according to claim 1, in which the matrix is alumina, silica, magnesia, titanium oxide, zirconia, a phosphate of aluminium, titanium or zirconium, or alumina-boron oxide.

16. A catalyst according to claim 1, prepared by impregnation of a formed and calcined support, using at least one solution containing an element from group VI and, simultaneously or subsequently, using at least one solution containing an element from group VIII, followed by calcining.

17. A heavy cut hydrocracking process carried out at a temperature of more than 230° C., a pressure of more than 2 MPa, with a quantity of hydrogen of at least 100 l/l of feed, a space velocity of 0.2–10 h$^{-1}$, and with a catalyst in accordance with claim 1.

18. A process for hydrocracking of heavy cuts, comprising subjecting said cuts to effective hydrocracking conditions in the presence of a catalyst according to claim 1.

19. A process according to claim 18, wherein in the catalyst the catalytic element is from groups VI and/or VIII of the periodic table, and the catalyst contains 1–40% by weight of said element.

20. A process according to claim 18, wherein the catalyst also contains phosphorous.

21. A process according to claim 20, wherein the catalyst contains less than 15% of phosphorous.

22. A process according to claim 18, wherein in the catalyst the trioctahedral 2:1 phyllosilicate is synthesized in a fluoride medium.

23. A process according to claim 18, wherein in the catalyst the trioctahedral 2:1 phyllosilicate has:

a) the following general chemical formula for a half-cell:

$$M^{m+}{}_{(x+\epsilon y)/m}[(Si_{(4-x)}T_x)(Mg_{3-y}S_y)O_{10}(OH_{(2-z)}F_z)]^{(x+\epsilon y)-},nH_2O$$

where

S is at least one of Li, Zn, Ni, Co, Mn, Fe, Cu, Al or Ga;

T represents an element of group IIIA of the periodic classification of the elements or iron;

M is at least one compensating cation from the reaction medium or introduced by at least one ion exchange process, from groups IA, IIA or VIII of the periodic table, a proton, an organic cation containing nitrogen, an ammonium cation or a rare earth cation;

m is the valence of cation M;

x is 0to 2;

y is between 0 and 1;

z is greater than 0 and less than or equal to 2;

n is a positive real number or zero;

ε equals 2 when S is monovalent element;

ε equals 0 when S is divalent element;

ε equals −1 when S is trivalent element;

b) an X-ray diffraction diagram having the following lines:

a line corresponding to a d/hklof $1.52 \pm 0.01 \times 10^{-10}$ m;

two further lines at $d_{hkl}$ values of: $4.53 \pm 0.02 \times 10^{-10}$ m and $2.56 \pm 0.045 \times 10^{-10}$ m;

at least one 001 reflection such that $d_{001}$ is: $10.5 \times 10^{-10}$ m or $19.5 \times 10^{-10}$ m;

c) a fluorine content producing a F/Si molar ratio is 0.1 to 4.

24. A process according to claim 23, wherein in the catalyst the phyllosilicate is synthesized in a medium with a pH of less than 7.

25. A process according to claim 18, wherein in the catalyst the trioctahderal 2:1 phyllosilicate is bridged.

26. A process according to claim 25, wherein in the catalyst the triooctahedral 2:1 phyllosilicate is bridged using a process comprising at least one treatment in which a solution of polycations is brought into contact with the phyllosilicate to be bridged comprising exchangeable cations, to for a reaction mixture; then exchange is carried out between the polycations and the exchangeable cations of the phyllosilicate; and the product obtained is separated by filtering and washing; wherein the mass of the phyllosilicate to be bridged per total solution volume is 1 to 200 g/l;

the exchange is carried out at a temperature of 15° C. to 100° C.; for 1 minute to 3 hours; and separation is for 20 seconds to 60 minutes per liter of solution containing product to be separated in suspension.

27. A process according to claim 26, wherein in the catalyst the polycations used are $[Al_{13}O_4(OH)_{24}$ $(H_2O)_{12}]^{17+}$, polycations containing at least one of zirconium, titanium, molybdenum or vanadium, $[Zr_4(OH)_8(H_2O)_{16}]^{8+}$, or $[ZrOCl_2Al_8(OH)_{20}]^{4+}$.

28. A process according to claim 18, wherein the catalyst support comprises 30% to 96% by weight of matrix, 4% to 70% by weight of trioctahedral 2:1 phyllosilicate, and 0.1 to 20% by weight of Y zeolite.

29. A process according to claim 18, wherein the catalyst support comprises 50% to 85% by weight of matrix, 15% to 50% by weight of trioctahderal 2:1 phyllosilicate, and 0.1 to 10% by weight of Y zeolite.

30. A process according to claim 18, wherein the catalyst support contains 10% to 30% of at least one Y zeolite.

31. A process according to claim 18, wherein the catalyst matrix is alumina, silica, magnesia, titanium oxide, zirconia, a phosphate of aluminium, titanium or zirconium, or alumina-boron oxide.

32. A process according to claim 18, wherein the catalyst is prepared by impregnation of a formed and calcined support, using at least one solution containing an element from group VI and, simultaneously or subsequently, using at least one solution containing an element from group VIII, followed by calcining.

* * * * *